(12) United States Patent
Steinbrecher et al.

(10) Patent No.: US 6,197,451 B1
(45) Date of Patent: Mar. 6, 2001

(54) CORROSION INHIBITING ELECTROLYTIC SOLUTIONS

(75) Inventors: Lester Steinbrecher, North Wales; R. Ashton White, Nicholson; Gerald A. Black, West Chester, all of PA (US)

(73) Assignee: Henkel Corporation, Gulph Mills, PA (US)

( * ) Notice: Subject to any disclaimer, the term of this patent is extended or adjusted under 35 U.S.C. 154(b) by 0 days.

(21) Appl. No.: 09/055,958

(22) Filed: Apr. 7, 1998

(51) Int. Cl.$^7$ .............................. H01M 6/04; H01M 10/08
(52) U.S. Cl. ........................ 429/347; 429/204; 429/199; 29/623.1
(58) Field of Search ..................................... 429/204, 344, 429/345, 347, 199, 201; 29/623.1

(56) References Cited

U.S. PATENT DOCUMENTS

| | | |
|---|---|---|
| 3,281,281 | 10/1966 | Schaefer . |
| 3,767,474 | 10/1973 | Cohn . |
| 3,928,066 * | 12/1975 | Lewenstein ..................... 429/347 |
| 3,945,849 | 3/1976 | Hoffman . |
| 4,588,448 | 5/1986 | Baumann et al. . |
| 4,617,244 | 10/1986 | Greene . |
| 4,780,150 | 10/1988 | Anderson et al. . |
| 4,801,511 | 1/1989 | Young . |
| 4,851,149 | 7/1989 | Carandang . |
| 5,362,317 | 11/1994 | Patel et al. . |
| 5,374,455 | 12/1994 | Patel et al. . |
| 5,411,607 | 5/1995 | Basaly et al. . |
| 5,582,934 | 12/1996 | Steinbrecher . |
| 5,672,181 | 9/1997 | Warlimont et al. .................. 29/623.5 |

FOREIGN PATENT DOCUMENTS

| | | | |
|---|---|---|---|
| 8-078045 | * 3/1996 | (JP) | .............................. H01M/10/08 |
| WO 97/49139 | * 12/1997 | (WO) . | |

* cited by examiner

*Primary Examiner*—Stephen Kalafut
*Assistant Examiner*—Susy Tsang
(74) *Attorney, Agent, or Firm*—Wayne C. Jaeschke; Stephen D. Harper; Lance G. Johnson

(57) ABSTRACT

The present invention relates to methods and compositions for reducing corrosion and gassing that occurs within lead-acid storage batteries. In particular, combinations of anodic corrosion inhibitors such as hydrolyzed gelatin and water soluble iodides are preferred inhibitors; and these inhibitors provide excellent results when also used in combination with surfactants which are sodium salts of diphenyl sulfonate. Admixtures of anodic corrosion inhibitors, replace the conventional electrolyte solution within the battery.

20 Claims, No Drawings

CORROSION INHIBITING ELECTROLYTIC SOLUTIONS

BACKGROUND OF THE INVENTION

I. Field of the Invention

This invention relates to enhanced electrolytic solutions for use in lead-acid storage batteries. These enhanced solutions reduce corrosion in the battery which can cause damage to battery posts, cables, and terminals, thereby shortening the useful life of the batter; and also reduce gassing in the battery, which is the production of hydrogen gas, which can result in explosions under severe thermal conditions.

II. Prior Art

Lead-acid storage batteries have been used for many years for many purposes. It is well known that most automobile batteries are of the lead-acid variety; and many other types of vehicles rely on lead-acid batteries as a source of power to start their internal combustion engines. Such vehicles include airplanes, ships, submarines, and most mobile construction equipment.

Further, lead-acid batteries are used as sources of power where there is no access to conventional sources of electricity, and the use of a generator is not feasible. Even in instances where a generator is employed, the generator is likely to use a lead-acid storage battery as its source of ignition.

Surprisingly, over the years there have been few, if any, substantive advancements in lead-acid storage battery technology. Most advancements in battery technology have related to the advent of new types of batteries; such as those based on metal-anhydrides, zinc, or other components commonly known as alkaline batteries. Advancements in lead-acid batteries have been limited to improvements in the battery casings or in corrosion reducing seals where the lead posts emerge from the casing. Few attempts have been made to improve the performance of a lead-acid storage battery by enhancement or modification of the electrolyte solution.

In U.S. Pat. No. 4,617,244, by Green, it was suggested that the use of mixtures of metal salts or chelates of iron and magnesium could effectively increase the flow of current through the electrolyte solution to improve battery performance. However, the mechanism by which the addition of chelants and metal salts could enhance battery performance is unclear; and it is likely that the use of such additives would cause contamination of the lead plates and premature loss of battery activity.

The present invention avoids the potential problems presented by the use of metal salts and chelants by employing an electrolyte solution which works without adding strong ionic components to the electrolyte, thus reducing the possibility of short-lived enhancements to the battery or premature loss of battery activity.

Further, in U.S. Pat. No. 4,801,511 to Young, it was disclosed that certain chalcogenic compounds were useful in improving battery performance and corrosion resistance. However, due to the environmentally undesirable nature of certain chalcogens and the required concentrations that Young teaches, the present invention has successfully eliminated the need to rely solely on chalcogens and employs a variety of newly discovered corrosion inhibiting agents for use in lead-acid storage batteries.

Also, in U.S. Pat. No. 5,582,934 to Steinbrecher, a number of cathodic corrosion inhibiting agents were disclosed as being beneficial to the performance of lead-acid storage batteries. The instant invention goes beyond the teaching of cathodic inhibitors and, herein, discloses the efficacy of anodic inhibitors for reducing corrosion and gassing within a lead-acid storage battery.

Further, it has been found that various classes of corrosion inhibiting compounds can function to reduce the corrosion in the highly acidic environment of a lead acid storage battery, when used in accordance with the teachings herein. Among these are the corrosion inhibited acid cleaners taught in U.S. Pat. No. 4,780,150, to Anderson, which is hereby incorporated by reference. Anderson teaches solutions for treating metal using partially hydrolyzed proteins such as gelatins or caseins, or mixtures thereof. When modified in according for use within lead-acid storage batteries, partially hydrolyzed gelatins can be used to protect the plates, seals, terminals, and cables of a conventional storage battery while reducing the potential for gassing which occurs as hydrogen gas is liberated when corrosion occurs.

Basaly et al, in U.S. Pat. No. 5,411,607, which is hereby incorporated by reference, teach the process of sealing anodically oxidized aluminum surfaces by using a composition having an effective amount of a source of alkali metal ions (lithium ions are taught as preferred). The composition taught by Basaly et al has been unexpectedly found to produce excellent results in the protection of the metal surfaces in lead-acid batteries when used in accordance with the methods and compositions taught herein.

In U.S. Pat. No. 5,374,455 and U.S. Pat. No. 5,362,317, each to Patel et al and both hereby incorporated by reference, it was taught that aluminum oxide sealants with alkali earth metals would provide improved seal quality and reduced smutting. Variations of these compounds have been found to be beneficial for sealing metal surfaces within lead-acid storage batteries to inhibit the formation of corrosion and the reduce the gassing effects associated with corrosion formation.

In U.S. Pat. No. 4,588,488, to Baumann et al, which is hereby incorporated by reference, additional aluminum oxide sealing compositions are disclosed which employ the reaction product of one or more sulphonated aromatic compounds with an aldehyde and/or dimethylolurea or a mixture of formadelhyde and urea with a cobalt or nickel salt.

Finally, Cohn taught, in U.S. Pat. No. 3,767,474, which is hereby incorporated by reference, methods and compositions for dyeing and sealing aluminum oxide coatings. Preferred by Cohn are compositions containing disodium 4-dodecylated oxydibenzene sulfonate and one or more hydrolyzable metallic salts, typically of the metals Ni, Co, Pb, Sn, Al, Cr, Cu, Mn, Fe, and Bi.

SUMMARY OF THE INVENTION

The present invention, in its primary aspect, relates to methods and [various] compositions for improving the properties of lead-acid storage batteries and in particular, to the use of novel combinations or corrosion inhibitors which seal the metal surfaces within a lead-acid battery to reduce corrosion and gassing. One aspect of the invention is an improvement of the electrolyte solutions used in conventional storage batteries.

To realize the benefits of the present invention, a functionally effective amount of a corrosion inhibitor is added to a standard battery electrolyte solution. A standard battery electrolyte solution usually comprises from about 35% to about 50% sulfuric acid, by volume, in water. A functionally effective amount is that which will effect corrosion inhibition within the battery; but for practical purposes is going to be in the range of 0.01% to about 50%, by volume, of the total electrolyte solution. In a preferred embodiment of the invention, the corrosion inhibiting agent, or mixture of agents, will comprise from about 0.1% to about 0.5% of the total electrolyte solution, by weight. In another preferred embodiment, the electrolyte solution will contain, in addition to the corrosion inhibiting agent, from about 0.05% to about 1.0% of a diphenyl sulfonate derivative such as dodecyl diphenyloxide disulfonic acid.

Preferred corrosion inhibiting agents include hydrolyzed proteins such as gelatin hydrosylate, organic iodine complexes, water soluble iodides, and quaternary ammonium salts, as their anionic nature makes them excellent anodic corrosion inhibitors in the highly acid environment of a lead-acid battery. However, the novel use of corrosion inhibitors, in general, in combination with diphenyl sulfonate derivates allows for the use of a wide variety of corrosion inhibiting agents. Among these are those enumerated in U.S. Pat. No. 5,582,934 to Steinbrecher, which is incorporated by reference, and teaches the use of a variety of corrosion inhibitors for the reduction of corrosion and gassing in a lead-acid battery while improving the performance characteristics of the battery. Exemplary of the compositions taught by Steinbrecher in U.S. Pat. No. 5,582,934 are those that contain components selected from the group consisting of at least one triazine, thiourea, diethyl-thiourea, di-butyl thiourea, propargyl alcohol, 1-hexyn 3-ol, hexamethylene tetramine, keto amine, triphenyl sulfonium chloride, at least one alkyl pyridine, and mixtures thereof, admixed in a functionally effective amount of the battery electrolyte solution.

The present invention expands on the prior teaching of Steinbrecher by the finding that the inclusion of a diphenyl sulfonate derivative surfactant can be added to the compositions disclosed in U.S. Pat. No. 5,582,934 to provide a superior electrolyte solution for reducing corrosion and gassing within a lead-acid storage battery. Alternately, and more preferred, is the use of the newly discovered anodic inhibitors, with or without a diphenyl sulfonate derivative surfactant; but most preferred is the combination of an anodic inhibitor with a diphenyl sulfonate surfactant in an aqueous solution of sulfuric acid as an electrolyte solution.

A novel method of preparing a corrosion inhibited battery with reduced gassing effects is also disclosed herein. The preparation is accomplished by obtaining a typical six-cell (at 2V each) housing for a lead-acid battery. Added to this housing is an electrolyte solution which comprises an aqueous solution of sulfuric acid, a functionally effective amount of an anodic corrosion inhibitor, and a functionally effective amount of a diphenyl sulfonate derivative surfactant. When employed in an automotive application, the battery will exhibit reduced corrosion at the posts, plates, terminals, and cables; and the gassing generated by the corrosion of the metal parts of the battery will be greatly reduced, greatly reducing the danger of explosion which can result from the liberation of hydrogen gassing which occurs when metal corrodes in an acidic environment.

DETAILED DESCRIPTION OF THE INVENTION

The preparation and compositions of corrosion inhibiting solutions, as well as methods of the present invention of enhancing lead-acid storage battery characteristics, are illustrated by way of the following examples. In these examples, and elsewhere in the specification, all parts and percentages are by weight unless expressly stated otherwise; and all temperatures are degrees Celsius unless stated otherwise. Further, all weights, temperatures, percentages, and other units of measure are understood to be modified by the term "about", unless expressly stated otherwise.

EXAMPLE 1

Preparation of Another Corrosion Inhibiting Electrolyte Solution

A corrosion inhibiting electrolyte solution for use in a lead-acid storage battery is prepared as follows:

Using suitable mixing apparatus, 4 lbs. of ground potassium iodide are mixed with 2 lbs. of polyvinylpyrrolidone, 64 lbs. sodium sulfate, 29 lbs. of hydrolyzed gelatin, and 1 lb. of POE(20)sorbitan monooleate.

Added to 100 lbs. of 35% sulfuric acid is 0.2 lbs. of the above mixture along with 0.4 lbs. of a 40% solution of dodecyl diphenyloxide disulfonic acid. The resulting mixture is suitable for use in a lead acid storage battery.

EXAMPLE 2

Method of Manufacturing a Lead Acid Storage Battery with Improved Corrosion Resistance An improved 12V lead acid storage battery with improved resistance to corrosion at the posts and on the plates and which exhibits reduced gassing, when compared to a traditional lead acid battery, is prepared by obtaining a new 12 volt six-cell lead acid storage battery which is not yet filled with electrolute solution. The battery is then filled with the electrolyte solution of Example 1

The enhanced battery can be expected to exhibit performance improvements including reduced gassing, increased shelf life (due to the reduced degradation from corrosion of battery's components), and reduced corrosion at the posts, terminals, and cables attached thereto.

EXAMPLE 3

Preparation of a Corrosion Inhibiting Electrolyte Solution

Another corrosion inhibiting electrolyte solution is prepared as follows:

In 60.0 lbs. of tap water which has been warmed to 90 degrees F., 12.0 lbs. of hydrolyzed gelatin is completely dissolved. Next, 2.0 lbs. of 75% phosphoric acid and 9.83 lbs. of nonylphenoxy (polyethylene oxy) 8-ethanol are added and the solution is mixed well. To this, 4.67 lbs of ethylene diamine dihydriodide are added and mixing continues until the all components are completely dissolved.

Also added are 7.5 lbs. of propylene glycol and 4.0 lbs of an ethoxylated fatty acid such as POE (20) sorbitan monooleate.

Once the solution is homogeneous, it is then ready to be used to prepare the electrolyte solution.

EXAMPLE 3a

Preparation of an Enhanced Electrolyte Solution

In another possible embodiment of the present invention, the mixture prepared in Example 3 is used to prepare an electrolyte solution with corrosion inhibiting properties. In this example, an electrolyte solution is prepared by mixing 0.5 lbs of the mixture of Example 3 with 99.0 lbs of a 35% sulfuric acid solution. Into this solution, 0.5 lbs of a 45% solution of sodium dodecyl diphenyloxide disulfonate are added.

After thorough mixing, the solution is ready for use as the electrolyte in a lead acid storage battery. The battery will exhibit reduced gassing, lessening the likelihood of explosion under extreme thermal conditions; and the battery will, over time, experience reduced corrosion at the posts, terminals, plates, and cables than would a battery without the enhanced electrolyte solution of the present invention.

EXAMPLE 3b

Preparation of Electrolyte Solution

In yet another possible embodiment of the present invention, the mixture prepared in Example 3 is used to prepare an electrolyte solution with corrosion inhibiting properties. In this example, an electrolyte solution is prepared by mixing 0.75 lbs of the mixture of Example 3 with 99.0 lbs of a 35% sulfuric acid solution. Into this solution, 0.25 lbs of thiourea are added. Finally, 1.0 lbs of a 40% solution of sodium dodecyl diphenyloxide disulfonate is mixed into the solution.

After thorough mixing, the solution is ready for use as the electrolyte in a lead acid storage battery. The battery will exhibit reduced gassing, lessening the likelihood of explosion under extreme thermal conditions; and the battery will, over time, experience reduced corrosion at the posts, terminals, plates, and cables than would a battery without the enhanced electrolyte solution of the present invention.

EXAMPLE 3c

Preparation of Electrolyte Solution

In still another possible embodiment of the present invention, the mixture prepared in Example 3 is used to prepare an electrolyte solution with corrosion inhibiting properties. In this example, an electrolyte solution is prepared by mixing 0.25 lbs of the mixture of Example 3 with 98.5 lbs of a 35% sulfuric acid solution. Into this solution, 1.0 lbs of sodium dodecyl diphenyloxide disulfonate are added. Finally, 0.25 lbs of hexamethylene tetramine are added.

After thorough mixing, the solution is ready for use as the electrolyte in a lead acid storage battery. As in the previous examples, the resulting battery will exhibit superior gassing and corrosion resisting properties than batteries of the prior art.

EXAMPLE 4

Preparation of Electrolyte Solutions

In another possible embodiment of the present invention, an electrolyte solution is prepared as follows:

A mixture is prepared by dissolving 0.125 lbs of a powdered quarternary aryl ammonium chloride in 99.0 lbs of a 35.0% solution of sulfuric acid in water. Once the quarternary aryl ammonium chloride is completely dissolved, 0.5 lbs of sodium dodecyl diphenyloxide is added and mixed thoroughly. Further, 0.375 lbs of the mixture of example 3 is added and mixed thoroughly.

EXAMPLE 5

Preparation of Electrolyte Solution

A corrosion inhibitor for an electrolyte solution is prepared by mixing the following components:

| | |
|---|---|
| 55.0 lbs | Water |
| 6.4 lbs | Quaternary aryl ammonium chloride |
| 12.0 lbs | Gelatin hydrosylate |
| 2.0 lbs | Phosphoric acid (75% in water) |
| 9.83 lbs | Nonylphenoxy (polyethylene oxy) 8-ethanol |
| 3.27 lbs | Ethylene diamine dihydriodide |
| 7.50 lbs | Propylene glycol |
| 4.0 lbs | POE (20) Sorbitan monooleate |

After thorough mixing, the electrolyte solution is prepared by combining 5.0 lbs of the corrosion inhibitor with 95.0 lbs of a 35% solution of sulfuric acid in water.

CONCLUSION

Lead-acid storage batteries having an electrolyte solution in accordance with the present invention will exhibit improved properties such as greater stability, allowing the battery to remain idle for long periods of time without losing charge; improved battery life; reduced production of hydrogen gas, which will reduce the acid attack on the battery poles and greatly decrease the chances that a storage battery will explode; and reduced corrosion at the battery poles, allowing the battery manufacturer to use less costly measures to manufacture battery casing, cables, and seals. The advantages described above can be expected to be attained.

We claim:

1. An electrolyte solution for use in a lead-acid storage battery which comprises sulfuric acid, water, and a corrosion inhibiting solution, wherein said corrosion inhibiting solution comprises at least one component selected from the group consisting of hydrolyzed gelatin, patassium iodide and mixtures thereof.

2. The electrolyte solution of claim 1 wherein the concentration of said corrosion inhibitor in said electrolyte solution is from about 0.01% to about 50%, by weight, of said electrolyte solution.

3. The electrolyte solution of claim 2 wherein said corrosion inhibiting solution comprises from about 1.0% to about 25.0% of said electrolyte solution.

4. The electrolyte solution of claim 3 wherein said corrosion inhibitor comprises a mixture of hydrolyzed gelatin and polyvinylpyrrolidone.

5. The electrolyte solution of claim 3 where said corrosion inhibitor comprises a mixture of water soluble iodide and hydrolyzed gelatin.

6. The electrolyte solution of claim 5 which further comprises an ethoxylated fatty acid.

7. A method of preparing a lead-acid storage battery with reduced corrosion and gassing which comprises:
   A) providing a battery housing with at least a single electromotive cell;
   B) preparing an electrolyte solution in accordance with claim 4; and
   C) adding said electrolyte solution to said battery housing.

8. A method of preparing a lead-acid storage battery with reduced corrosion and gassing which comprises:
   A) providing a battery housing with at least a single electromotive cell;
   B) preparing an electrolyte solution in accordance with claim 1; and C) adding said electrolyte solution to said battery housing.

9. An electrolyte solution for use in a lead-acid storage battery which comprises sulfuric acid, water, and a corrosion inhibiting solution, wherein said corrosion inhibiting solution comprises:

a) at least one component selected from the group consisting of at least one triazine, thiourea, diethylthiourea, di-butyl thiourea, propargyl alcohol, 1-hexyn 3-ol, hexamethylene tetramine, keto amine, triphenyl sulfonium chloride, at least one alkyl pyridine, hydrolyzed gelatin, water soluble iodides, quarternary ammonium salts, alkali metal salts, alkaline metal salts, hydrolysable metal salts, and mixtures thereof; and b) at least one component selected from the group consisting of sodium salts diphenyl sulfonate polyvinylpyrrolidone and ethoxylated sorbitan monooleate.

10. The electrolyte solution of claim 9 in which component (a) comprises hydrolyzed gelatin, and at least one water soluble iodide; and component (b) comprises sorbitan monooleate.

11. The electrolyte solution of claim 9 wherein the concentration of component (a) is from about 1.0% to about 25.0%, by weight, of the total solution; the concentration of component (b) is from about 0.01% to about 5.0%, by weight, of the total solution; and the remainder comprises a 35%, by weight, solution of sulfuric acid in water.

12. The electrolyte solution of claim 9 in which component (a) comprises hydrolyzed gelatin; and component (b) comprises dodecyl diphenyloxide disulfonate and polyvinylpyrrolidone.

13. The electrolyte solution of claim 9 wherein component (a) comprises at least one of alkali metal salts, alkaline metal salts, hydrolysable metal salts, or mixtures thereof; and component (b) comprises at least one of either dodecyl diphenyloxide disulfonic acid or sodium dodecyl diphenyl oxide disulfonate.

14. A method of preparing a lead-acid storage battery with reduced corrosion and gassing which comprises:

A) providing a battery housing with at least a single electromotive cell;

B) preparing an electrolyte solution in accordance with claim 9, and adding said electrolyte solution to said battery housing.

15. A lead-acid storage battery that contains an enhanced electrolyte comprising sulfuric acid, water, and at least one component selected from the group consisting of hydrolyzed gelatin, potassium iodide, polyvinulpyrrolidone, a sodium salt of diphenyl sulfonate, and mixtures thereof.

16. The battery of claim 15 further comprising a quaternary ammonium salt.

17. An electrolyte solution for use in a lead-acid storage battery which comprises sulfuric acid, water, and at least one component selected from the group consisting of hydrolyzed gelatin, polyvinylpyrrolidone, a sodium salt of diphenyl sulfonate, potassium iodide and mixtures thereof.

18. The electrolyte solution of claim 17 which further comprises at least one component selected from the group consisting of a quaternary ammonium salt and an ethoxylated fatty acid.

19. The electrolyte solution of claim 17 further comprising more than 0.1%, by weight, of an ethoxylated fatty acid.

20. The electrolyte solution of claim 18 wherein said ethoxylated fatty acid is polyethyleneoxide sorbitan monooleate.

* * * * *